UNITED STATES PATENT OFFICE.

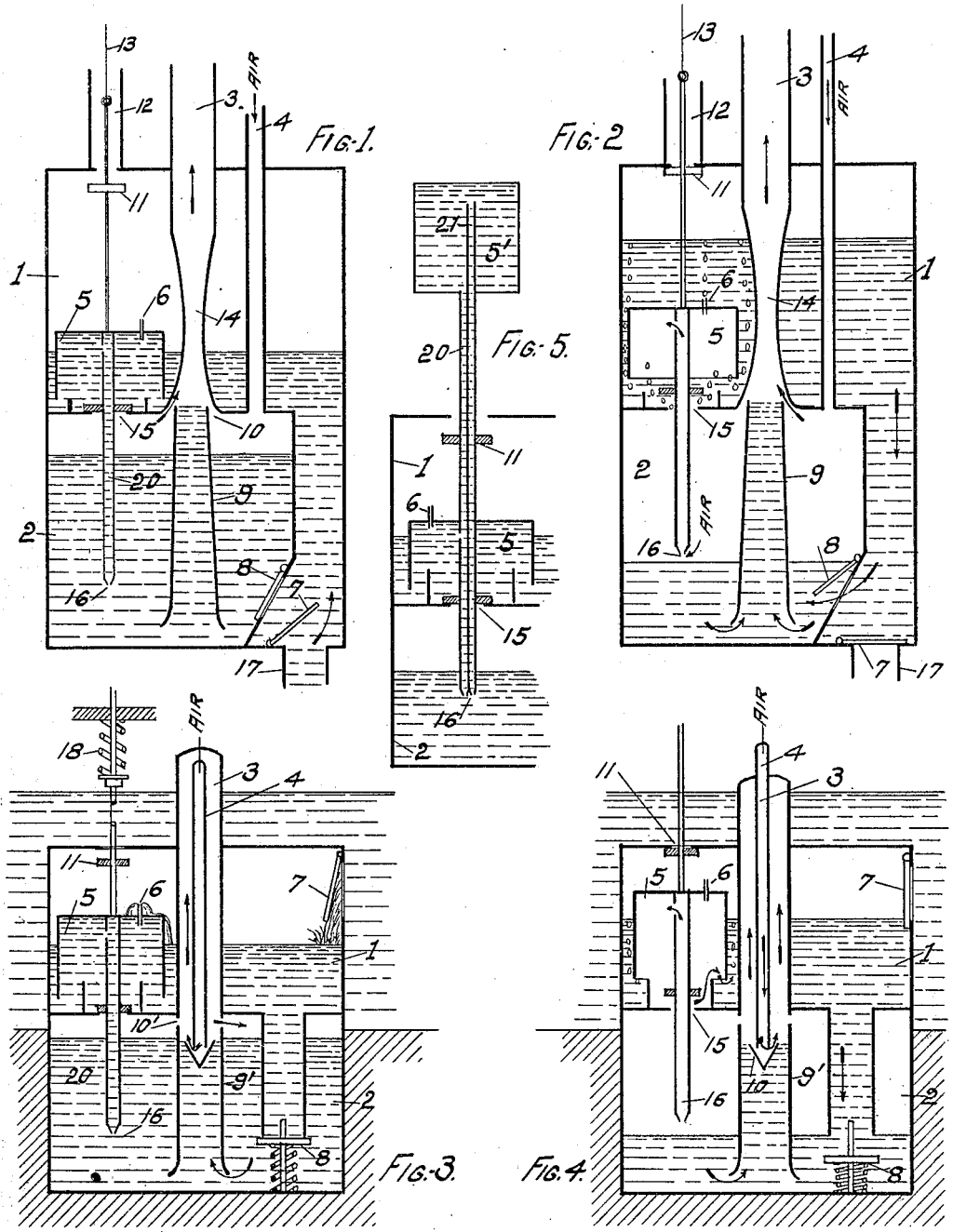

CHARLES L. HEISLER, OF ST. MARYS, OHIO.

PUMPING MACHINERY.

No. 856,636.  Specification of Letters Patent.  Patented June 11, 1907.

Application filed October 5, 1906. Serial No. 337,650.

*To all whom it may concern:*

Be it known that I, CHARLES L. HEISLER, a citizen of the United States, residing at St. Marys, in the county of Auglaize and State of Ohio, have invented certain new and useful Improvements in Pumping Machinery, relating more particularly to the type commonly known as "air lift-pumps," in which a large volume of air escaping upward through the discharge-pipe displaces and impels or blows the liquid upward through said pipe.

The object of my invention is primarily to obviate the necessity of an excessive submergence common to one type of pump and to avoid an intermittent action or discharge common to another type and to simplify its construction.

In the drawings forming part of this specification Figure 1 shows a vertical section of the apparatus in which the suction or trap chamber 1 is filling, and the blowing chamber 2 is discharging up the central tube 3. Fig. 2 shows the trap chamber 1 discharging into the blowing chamber, while the latter is continuously discharging volumes of air and water up through the central discharge tube 3. Figs. 3 and 4 are merely modifications of the device shown in Figs. 1 and 2 to be described hereinafter. Fig. 5 shows an auxiliary air tank.

The invention consists of essentially a trap chamber 1 arranged mainly above the blowing chamber 2 in such a manner that when the pressures in the two chambers are equalized, the liquid in the trap chamber 1 will gravitate into the lower chamber 2 through a large check valve 8. Another small valve 15 is also arranged between the chambers. This valve is attached to a stem 20 having an air float 5 and another air exhaust valve 11 fastened thereto. The lower part of the stem is hollow and at 16 is arranged with a small inlet which admits air or liquid up through the stem and into the float 5. When desirable the stem 13 can be prolonged to any distance for convenience in observing the action of the device, or in actuating it in case of derangement. In Fig. 1 the valve 15 is closed and the valve 11 is open. The float 5 becomes filled with water because the valve stem opening 16 is submerged in liquid thereby admitting no air to the float 5 from which it escaped through the small bleeder or opening 6 arranged in the top of the float. Evidently if a partial vacuum is created in the chamber 1 by the action of any suction pump connected with 12, liquid will be forced to enter it through the suction pipe 17 and valve 7. In Fig. 3 the device is submerged and the surrounding water will flow into the trap chamber by gravity.

Air at any suitable pressure enters the blowing chamber 2 in Fig. 1 through a pipe 4 attached to any form of air compressor or pressure tank. This air then enters the discharge tube 3 at 10 where, by its siphoning action in the tube 4, it causes the liquid to rise in the tube 9 as in an ordinary spraying device or ejector. This mixture of air and water is then blown or impelled upward through the tube 3 to any desirable elevation corresponding to the air pressure and relative volume of air and liquid passing upward through the tube. When the liquid level in the blowing chamber 2 drops below the inlet 16, as shown in Figs. 2 and 4, a quantity of air passes upward into the float 5 thereby causing it to lift and slightly open the valve 15, after which a large volume of air will suddenly lift the float and close the upper valve 11, at the same time equalize the pressures in the two chambers, close the valve 7 and fill the chamber 2 without interrupting the flow or discharge through the tube 3. Evidently the operation of the trap chamber 1 only is intermittent, but the discharge from the tube 3 is continuous, thereby avoiding pulsation or a change of velocity in the tube 3, which will materially increase the capacity and efficiency of the pump. By means of an adjustable spring 18 attached to the valve stem 13 the operation of the trap can be adjusted.

Evidently steam, air or gas can be used to actuate the pump for lifting liquids. When the conditions arise in which the float 5 is not large enough to lift the valves, an auxiliary tank 5' can be arranged on an extension of the hollow valve stem 20, so that water or air will be forced into it preferably from the chamber 2 to give additional weight or buoyancy as may be required. A small auxiliary air tube 21 is for the purpose of more quickly admitting air to the tank 5' so the water will rapidly discharge downward through the main tube 20.

What I claim is:

1. In a blow pump arranged for lifting liquids, the combination of a tube 3 for discharging the mixture of air and liquid, a tube 4 for admitting air or gas under pressure, said tubes being connected with a blowing chamber 2, which is provided with a water inlet, in combination with means for automatically refilling said blowing chamber 2 before it is nearly empty for the purpose of causing a continuous upward discharge of the liquid and air mixture through said tube 3, in the manner described.

2. In a blow pump arranged for lifting liquids, the combination of a tube 3 for discharging the mixture of air and liquid, a tube 4 for admitting air or gas under pressure, said tubes being connected with a blowing chamber 2, which is provided with a water inlet, in combination with a trap chamber 1 having a water inlet 7 and a valve 8 connecting it with the chamber 2 and means for actuating the trap when said chamber 2 is full or nearly empty and arranged for automatically refilling said blowing chamber 2 before it is nearly empty for the purpose of causing a continuous upward discharge of the liquid and air mixture through said tube 3, in the manner described.

3. In a blow pump arranged for lifting liquids, the combination of a tube 3 for discharging the mixture of air and liquid, a tube 4 for admitting air or gas under pressure, said tubes being connected with a blowing chamber 2, which is provided with a water inlet in combination with a trap chamber 1 having a water inlet 7 and a valve 8 connecting it with the chamber 2 and a float 5 arranged within the chamber, attached to an air discharge valve 11 and inlet 15 arranged between the chambers 1 and 2, said float 5 being actuated in the manner and for the purpose described.

4. In a blow pump arranged for lifting liquids, the combination of a tube 3 for discharging the mixture of air and liquid, a tube 4 for admitting air or gas under pressure, said tubes being connected with a blowing chamber 2, which is provided with a water inlet, in combination with a trap chamber 1 having a water inlet 7 and a valve 8 connecting it with the chamber 2 and a float 5 arranged within the chamber, attached to an air discharge valve 11 and inlet valve 15 arranged between the chambers 1 and 2, and a hollow valve stem or tube extending from said float 5 down into the chamber 2 for the purpose described.

5. In a blow pump arranged for lifting liquids, the combination of a tube 3 for discharging the mixture of air and liquid, a tube 4 for admitting air or gas under pressure, said tubes being connected with a blowing chamber 2, which is provided with a water inlet, in combination with a trap chamber 1 having a water inlet 7 and a valve 8 connecting it with the chamber 2 and a float 5 arranged within the chamber, attached to an air discharge valve 11, and inlet valve 15 arranged between the chambers 1 and 2 and an auxiliary tank or float 5' connected with said valve stem for the purpose described.

6. In a blow pump arranged for lifting liquids, the combination of a tube 3 for discharging the mixture of air and liquid, a tube 4 for admitting air or gas under pressure, said tubes being connected with a blowing chamber 2, which is provided with a water inlet, in combination with a trap chamber 1 having a water inlet 7 and a valve 8 connecting it with the chamber 2 and a float 5 arranged within the chamber, attached to an air discharge valve 11, and inlet valve 15 arranged between the chambers 1 and 2 and an auxiliary tank or float 5' connected with said valve, and an air tube 21 extending up into said float 5' for the purpose described.

7. In a blow pump arranged for lifting liquids, the combination of a tube 3 for discharging the mixture of air and liquid, a tube 4 for admitting air or gas under pressure, said tubes being connected with a blowing chamber 2, which is provided with a water inlet in combination with a trap chamber 1 having a water inlet 7 and a valve 8 connecting with it the chamber 2 and a float 5 arranged within the chamber, attached to inlet valve 15 arranged between the chambers 1 and 2, said float 5 being actuated in the manner and for the purpose described.

8. In a blow pump arranged for lifting liquids, the combination of a tube 3 for discharging the mixture of air and liquid, a tube 4 for admitting air or gas under pressure, said tubes being connected with a blowing chamber 2, which is provided with a water inlet, in combination with a trap chamber 1 having a water inlet 7 and a valve 8 connecting it with the chamber 2 and a float 5 arranged within the chamber, attached to inlet valve 15 arranged between the chambers 1 and 2, said float 5 being actuated by an extension rod 13 reaching to the surface for the purpose described.

9. In a blow pump arranged for lifting liquids, the combination of a tube 3 for discharging the mixture of air and liquid, a tube 4 for admitting air or gas under pressure, said tubes being connected with a blowing chamber 2, which is provided with a water inlet in combination with a trap chamber 1 having a water inlet 7 and a valve 8 connecting it with the chamber 2 and means for actuating the trap when said chamber 2 is full or nearly empty and arranged for automatically refilling, said blowing chamber 2 before it is nearly empty for the purpose of causing a continuous upward discharge of the liquid and air mixture through said tube 3 which extends nearly to the bottom of said blowing chamber 2 for the purpose described.

10. In a blow pump arranged for lifting liquids, the combination of a tube 3 for discharging the mixture of air and liquid, a tube 4 for admitting air or gas under pressure, said tubes being connected with a blowing chamber 2, which is provided with a water inlet in combination with a trap chamber 1 having a water inlet 7 and a valve 8 connecting it with the chamber 2 and means for actuating the trap when said chamber 2 is full or nearly empty and arranged for automatically refilling said blowing chamber 2 before it is nearly empty for the purpose of causing a continuous upward discharge of the liquid and air mixture through said tube 3 which extends nearly to the bottom of said blowing chamber 2 and an air pipe 4 arranged mainly within the discharge tube 3 for the purpose described.

11. In a blow pump arranged for lifting liquids, the combination of a tube 3 for discharging the mixture of air and liquid, a tube 4 for admitting air or gas under pressure, said tubes being connected with a blowing chamber 2, which is provided with a water inlet in combination with means for automatically refilling said blowing chamber 2 before it is nearly empty for the purpose of causing a continuous upward discharge of the liquid and air mixture through said tube 3 by the action of the siphon 4 and 10 for the purpose described.

12. In a blow pump arranged for lifting liquids, the combination of a tube 3 for discharging the mixture of air and liquid, a tube 4 for admitting air or gas under pressure, said tubes being connected with a blowing chamber 2, which is provided with a water inlet in combination with a trap chamber 1 having a water inlet 7 and a valve 8 connecting it with the chamber 2 and means for actuating the trap when said chamber 2 is nearly empty or full and arranged for automatically refilling said blowing chamber 2 before it is nearly empty for the purpose of causing a continuous upward discharge of the liquid and air mixture through said tube 3 which extends nearly to the bottom of said blowing chamber 2, said chamber 1 being arranged mainly above chamber 2 for the purpose described.

13. In a blow pump arranged for lifting liquids, the combination of a tube 3 for discharging the mixture of air and liquid, a tube 4 for admitting air or gas under pressure, said tubes being connected with a blowing chamber 2, which is provided with a water inlet in combination with a trap chamber 1 having a water inlet 7 and a valve 8 connecting it with the chamber 2 and a float 5 arranged within the chamber attached to an air discharge valve 11 and inlet valve 15 arranged between the chambers 1 and 2, and an adjustable spring 18 connected with said float 5 for the purpose described.

CHARLES L. HEISLER.

Witnesses:
   H. D. SIMKINS,
   H. L. DOERING.